Dec. 14, 1971  R. T. GUTZMER  3,626,772
VEHICLE TRANSMISSION APPARATUS
Filed Feb. 2, 1970  3 Sheets-Sheet 2
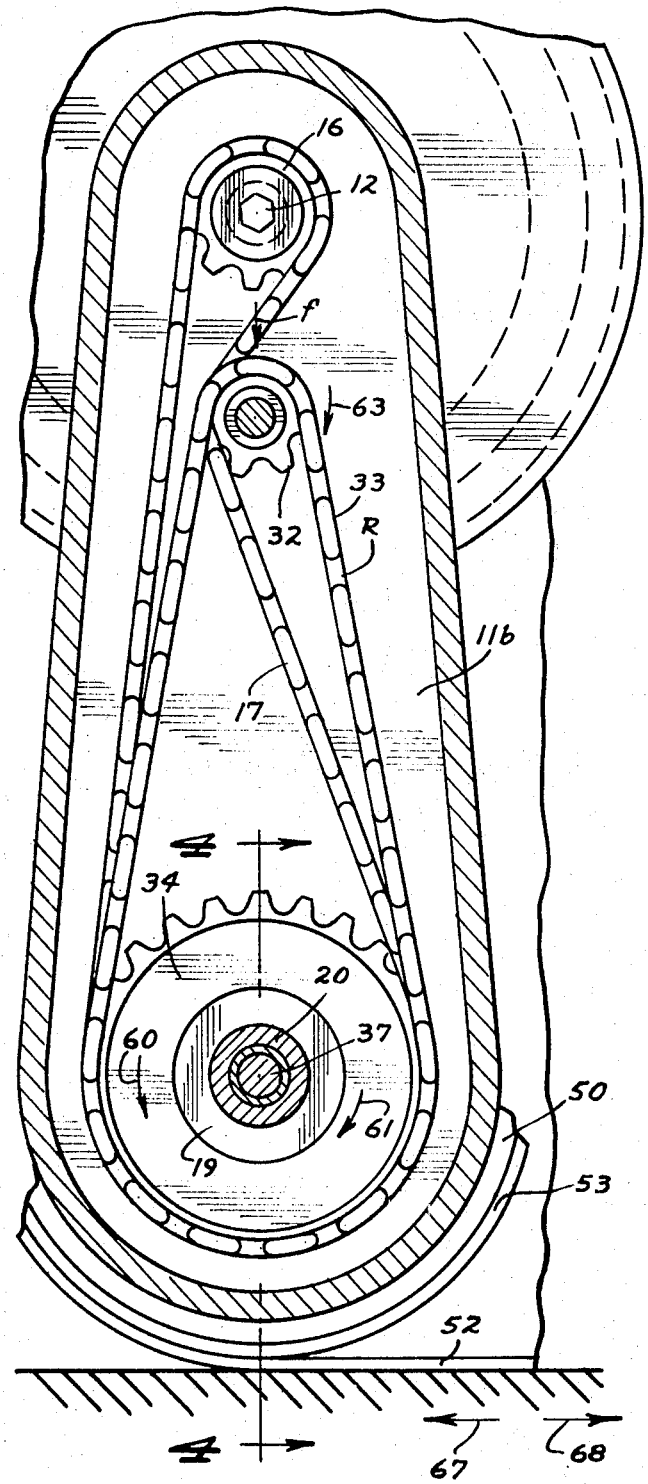
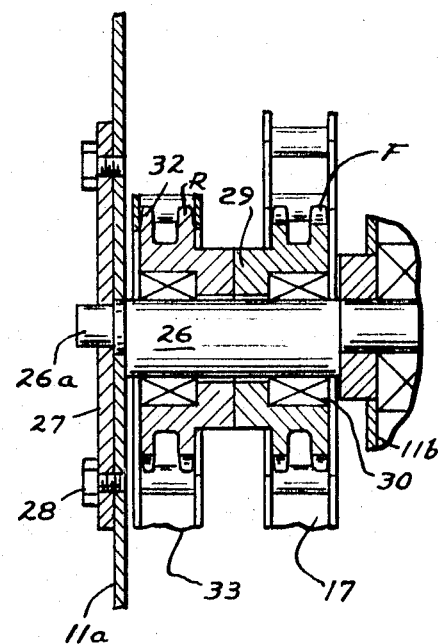
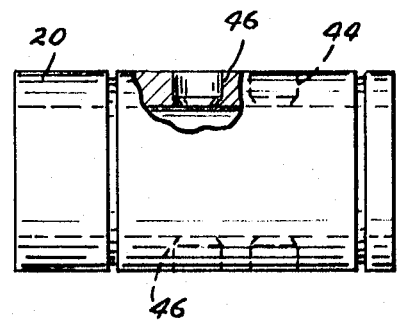
INVENTOR.
RALPH T. GUTZMER
BY
Lugger, Peterson, Johnson & Westman
ATTORNEYS

United States Patent Office 3,626,772
Patented Dec. 14, 1971

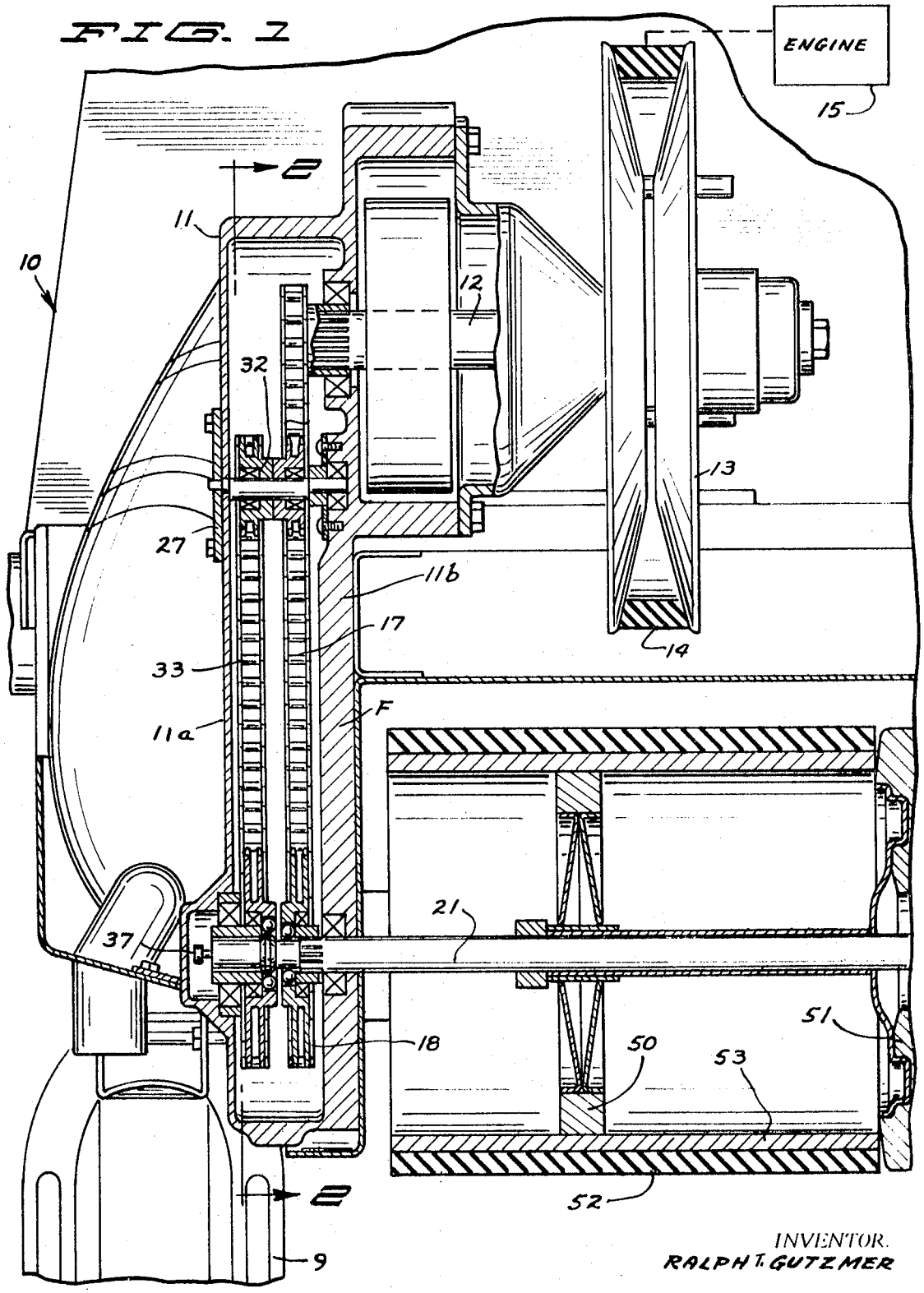

---

3,626,772
VEHICLE TRANSMISSION APPARATUS
Ralph T. Gutzmer, North St. Paul, Minn., assignor to Main Tool & Mfg. Co., Minneapolis, Minn.
Filed Feb. 2, 1970, Ser. No. 7,758
Int. Cl. F16h 7/10; F16d 19/00
U.S. Cl. 74—220                                   18 Claims

---

ABSTRACT OF THE DISCLOSURE

Clutch and transmission mechanism for a vehicle, for example, a snowmobile having a forward drive sprocket rotatably mounted by an annular clutch member which is keyed to the ground engaging member drive shaft and driven through a first chain from the main drive shaft sprocket, a reverse drive sprocket rotatably mounted by the annular clutch member and driven by a second chain that in turn is driven by a sprocket that is rotated in a direction opposite the main shaft from a chain tightener sprocket for the first chain, and operated mechanism for moving a clutch shifter member between a neutral position, a forward drive position that the forward sprocket drives the annular clutch member and a reverse drive position that the reverse sprocket drives the annular clutch member.

---

BACKGROUND OF THE INVENTION

Transmission and clutch mechanism having a main driven chain for driving a first sprocket in one direction, a drive conection between the main drive chain and a second sprocket that is driven in the opposite direction, and a clutch subassembly for mounting said sprockets and selectively imparting the drive from one of the sprockets to the shaft for the ground engaging member of the vehicle. In the prior art there has been provided jaw type clutches wherein the driven sprocket hub has a cut out in its annular face and an axially shiftable annular clutch member having a protrusion that forms a matching fit with the cut out, both of which are mounted on a common shaft. Also there has been provided on a common shaft a drive sprocket having axial apertures and an axially shiftable clutch member having axially extending pins located to be moved into said apertures. Further there has been provided on a common shaft a driven sprocket and an annular clutch member having cooperating annular surfaces to provide a friction type drive connection between the two. However, such prior art clutches for many uses require an undesirable elongation of the shaft. Further, for many uses, such prior art clutches require an undesirable elongation of the shaft when two sprockets are mounted on the shaft and rotated in opposite direction and the clutch is to be operated to drivingly connect one or the other sprocket to the shaft to drive the shaft in the desired direction. Additionally, in the prior art, there has not been provided a relatively simple transmission clutch assembly for selectively providing a forward drive and a reverse drive for vehicles such as snowmobiles and lawn mowers. In order to overcome the above mentioned problems and others, this invention has been made.

SUMMARY OF THE INVENTION

A pair of sprockets that are freely rotated in opposite directions on a common annular clutch member that is keyed to the driven shaft that in turn is connected to the ground engaging member for propelling a vehicle, a shiftable clutch member within the annular clutch member, and means mounted by the annular clutch member and moved by the shiftable clutch member to provide a drive connection between the desired one of the sprockets and the annular clutch member to rotate the annular clutch member in the desired direction. One of the objects of this invention is to provide a new and novel clutch assembly for selectively providing a forward and reverse drive to a vehicle and to mount oppositely driven sprockets to rotate about a single axis. In furtherance of the above mentioned object, it is another object of this invention to provide a new and novel clutch assembly that minimizes the axial space requirements for mounting the sprockets and clutch assembly. Still another object of this invention is to provide a new and novel clutch assembly having an annular clutch member mounting oppositely driven sprockets adjacent one another and a shiftable clutch drive that for the most part is located within the annular clutch member to selectively provide a drive connection between the annular clutch member and the desired sprocket. An additional object of this invention is to provide new and novel mechanism for reversely driving a shaft that is drivingly connected to the ground engaging member of a vehicle from the chain-sprocket arrangement for driving the vehicle in a forward direction. In furtherance of the last mentioned object, it is still another object of this invention to provide a new and novel reverse drive chain-sprocket arrangement that is driven from the chain tightener sprocket for the forward drive chain-sprocket arrangement.

BRIEF DESCRIPTION OF THE DRAWINGS

FIG. 1 is a fragmentary transverse vertical cross-sectional view of a vehicle that illustrates the transmission and clutch mechanism of this invention in a position for reverse drive of the vehicle;

FIG. 2 is a fragmentary longitudinal cross-sectional view of the transmission and clutch mechanism, said view being generally taken along the line and in the direction of the arrows 2—2 of FIG. 1;

FIG. 3 is an enlarged fragmentary transverse cross-sectional view of the chain tightener and reverse drive sprocket mechanism shown in FIG. 1;

FIG. 7 illustrates the clutch drive bushing, a portion of this view being shown in cross-section.

DESCRIPTION OF THE PREFERRED EMBODIMENT

Figure 4:
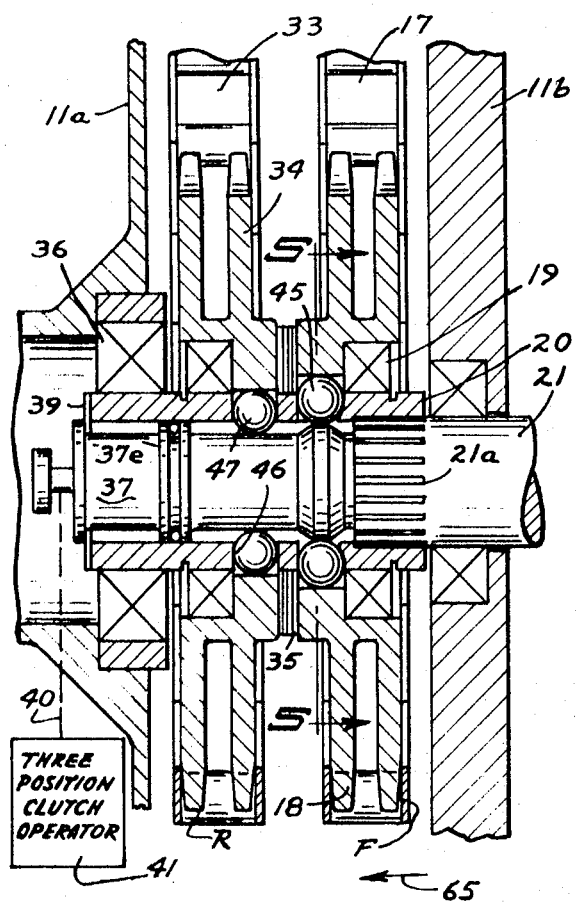
FIG. 4 is an enlarged, fragmentary transverse cross-sectional view of the driven sprockets and clutch mechanism, said view being generally taken along the line and in the direction of the arrows 4—4 of FIG. 2 showing the clutch mechanism in a position for forward drive of the vehicle.
Figure 5:
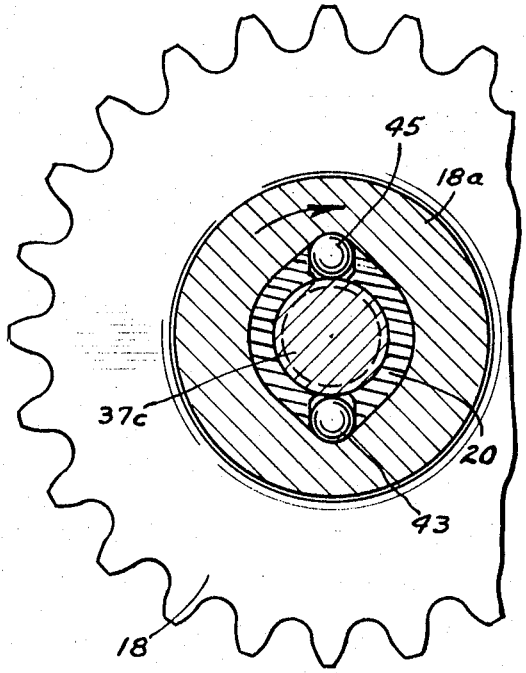
FIG. 5 is a cross-sectional view generally taken along the lines in the direction of the arrows 5—5 of FIG. 4 to illustrate the clutch in a forward drive condition.

Referring now in particular to FIG. 1 there is in part illustrated a snowmobile, generally designated 10, that includes a ski 9 and a frame F that includes a transmission housing 11. Rotatably mounted on the housing 11 to extend outwardly thereof is a horizontal shaft 12 having a variable sheave 13 keyed thereto exteriorly of the housing. The sheave 13 is driven by a belt 14 that in turn in driven from a variable sheave (not shown) that is driven by the engine 15, this one way drive to shaft 12 being by conventional structure. The engine is mounted on the frame of the vehicle 10. A main drive sprocket 16 is located within the housing 11 and keyed to the shaft 12, a chain 17 being extended around sprocket 16 and around sprocket 18 to drive sprocket 18. Sprocket 18 is rotatably mounted by bearings 19 which in turn are mounted on the one end portion of the clutch drive bushing 20 whereby said sprocket may freely rotate relative the annular clutch member 20. The annular clutch member has keyways in one end portion that have keys 21a of the adjacent end portion of the belt drive shaft 21 extended thereinto to drive said shaft when the clutch member 20 is being rotated. The shaft 21 is in part rotatably mounted by the housing wall 11b.

A chain tightener shaft 26 has stud portions rotatably mounted by the opposite wall portions 11a, 11b of the transmission housing whereby the central axis of the main body portion of the shaft may be adjusted relative the central axis of the shaft 12 and the clutch member 20. The stud portion that extends through the wall 11a has a further reduced diameter stud portion 26a that is extended through a plate 27, plate 27 being bolted at 28 to the wall 11a. The plate 27 has a plurality of circumferentially spaced apertures whereby rotating the plate and extending the bolts 28 through different apertures, the position of the central axis of the main body portion of the shaft 26 may be varied relative to the central axis of shaft 12 and clutch member 20 and retained in an adjusted position. A chain tightener sprocket 29 is rotatably mounted on the main body portion of the shaft 26 by a bearing 30, sprocket 29 being positioned to bear against chain 17 and be driven by said chain to rotate in a direction opposite the direction of rotation of sprockets 16 and 18. Also rotatably mounted on the main body portion of shaft 26 by a bearing member is a sprocket 32, the sprocket 32 being welded or otherwise fixedly attached to sprocket 29 to be rotated thereby. A chain 33 is extended around sprocket 32 and sprocket 34 to drive sprocket 34. Sprocket 34 is rotatably mounted on the clutch member 20 by a bearing 19, there being provided a bearing member 35 (for example an oil impregnated washer) between adjacent portions of sprockets 18, 34 to retain the sprockets spaced from one another and permitting the sprockets simultaneously being rotated in opposite directions. Sprockets 18 and 34 are mounted on the clutch member 20 to permit them freely rotating relative to clutch member 20. The end portion of the clutch member 20 that is opposite the belt drive shaft 21 is rotatably mounted by transmission wall 11a through the provision of a bearing 36.

Figure 6:
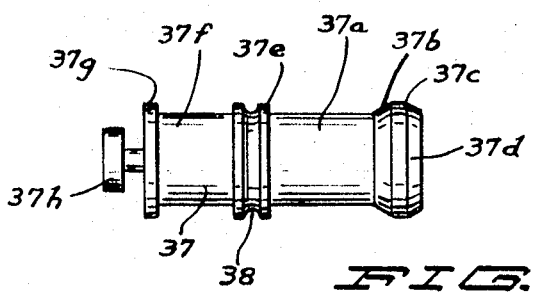
FIG. 6 shows the clutch shaft shift member.

Slidably mounted in the bore of the annular clutch member 20 is an axially elongated, shaft-type clutch-operated member 37. As may be noted from FIG. 6, the clutch shaft shift member 37 has an axially elongated, constant diameter intermediate portion 37a that at one end has the minor base of a frusto-conical portion 37b integrally joined therewith. Integrally joined to the major base of portion 37b is a constant diameter portion 37c that is of a substantially larger diameter than portion 37a, and of a diameter forming a relatively close sliding fit with the inner surface of clutch member 20. Integrally joined to the opposite end of portion 37c is the major base of the frusto-conical portion 37d, the surfaces of portions 37b, 37e being tapered at about equal but opposite angles and being of substantially the same axial lengths. The end of the constant diameter portion 37a opposite portion 37b is integrally joined to enlarged diametric portion 37e which has a central circumferential groove 38 for mounting an O-ring to provide a fluid seal between clutch members 37, 20. The maximum diameters of portion 37e on opposite sides of the groove are slightly less than the inside diameter of clutch member 20. A second constant diameter, axially elongated portion 37f has one end integrally joined to portion 37e on the side opposite portion 37a; portions 37a and 37f being of the same diameters. The opposite end of portion 37f is integrally joined to the enlarged diametric portion 37g, there being provided a snap ring 39 on portion 37f that is abuttable against portion 37g and the adjacent annular end surface of the annular clutch member 20 to limit the movement of clutch member 37 inwardly toward shaft 21 to a position spaced therefrom. The outer end portion 37h that is joined to portion 37d is grooved to have a clutch fork designated by the line 40 to extend thereinto for selectively moving the clutch member 37 toward and away from the shaft 21, the clutch fork being operated by a suitable clutch lever 41 that is mounted on the vehicle 10 for movement between three positions: forward, neutral and reverse.

The hub 18a of the sprocket 18 has an inner peripheral wall that is provided with diametrically opposed recesses 43. Other than for the recesses 43, the inner peripheral wall of the sprocket hub forms a relatively close fit with the clutch member 20 but is of a size to be freely rotatable relative thereto. Similarly the hub of sprocket 34 has a hub that is provided with diametrically opposed recesses. The annular clutch member 20 is provided with a pair of diametrically opposed apertures 44 for mounting the pair of steel balls 45 in a position to be moved radially outwardly into engagement with the wall portion of sprocket 18 that defines recesses 43; whereby rotation of sprocket 18 will cause clutch member 20 to rotate in the same direction and a second pair of diametrically opposed apertures 46 for mounting a pair of steel balls 47 for radial movement outwardly to a position to abut against the walls that define recesses of hub 34 whereby rotation of sprocket 34 will cause the clutch member 20 to rotate. The apertures 44, 46 have radially inwardly beveled portions to limit the radially inward movement of the balls that are mounted therein; but at the same time permit sufficient portions of the balls being extended into the central bore of the clutch member 20 to be moved radially outwardly as described hereafter. The diameter of each of the balls 45, 47 is greater than the radial thickness of the wall of annular member 20. Further the axial spacing of the balls (and apertures 44, 46) is greater than the corresponding dimension of portion 37c. Additionally the axial spacing of the radially innermost portion of the balls is greater than the corresponding dimension of the enlarged diametric portions 37b, 37c, 37d.

A conventional belt 52 that is engageable with the ground for propelling the snowmobile over the snow is mounted and driven by the belt drive and mounting members 50, 51 which are mounted by the belt drive shaft 21. It is to be understood that even though the invention has been illustrated and described with reference to a snowmobile, that the transmission and clutch apparatus of this invention may be utilized for driving other vehicles, for example through suitable connections, the shaft 21 could be used for driving the wheels of a golf cart or a lawn mower.

The structure of the apparatus being as mentioned and described, the use thereof will now be set forth. Normally prior to starting the engine 15, the clutch operator 41 will operate to move the clutch operated member 37 to a neutral position that portions 37b, 37c and 37d are axially intermediate the balls 45, 47. At this time the balls 47 will be radially opposite the constant diameter portion 37a, while the balls 45 will be axially between the adjacent end surfaces of the clutch operated member and shaft 21. As a result, the balls, if located in any of the recesses of the sprockets 18, 34, are not prevented from freely moving out of said recesses; and therefore even though the said sprockets are being driven, the sprockets will not impart any rotary motion to the annular clutch member 20.

Upon starting engine 15 and bringing it up to speed, the belt 14 will sufficiently frictionally engage the sheave 13 to rotate said sheave and apply rotary motion to the shaft 12. With the shaft 12 rotating, the sprocket 16 which is keyed thereto will through chain 17 drive sprocket 18 in the direction of the arrow 60 (see FIG. 2) and the sprockets 29, 32 in the direction of the arrow 63. Sprockets 29, 32 being driven in the direction of the arrow 63 will through the chain 33 drive the sprocket 34 in the direction of the arrow 61. If it is desired to have the vehicle propelled in a forward direction, then the clutch operator 41 is moved to axially move the clutch operated member 37 from its neutral position to the position illustrated in FIG. 4 wherein surface portion 37c is radially opposite the balls 47. It is to be mentioned that in moving the operated member 37 in the direction opposite of arrow 65, the frusto-conical surface portion 37d engages the balls to force the balls radially outwardly; however, until the time that the recesses of the sprocket 18 have been moved to a position radially adjacent the balls 45, said balls cannot be moved a significant distance radially outwardly. Upon balls 45 being radially opposite the recesses, the clutch member is moved in the direction opposite of arrow 65, the balls being moved radially outwardly by the surfaces 37d and onto the surfaces 37c whereby the balls are retained in the recesses of the hub 18a to cause the clutch member 20 to be rotated by the sprocket 18. The rotation of sprocket 18 is, of course, imparted through the keyways of said sprocket and the keys of shaft 21 to cause the shaft to rotate in a direction through belt mounting and drive members 50, 51, 53 to propel the vehicle forward (arrow 67, FIG. 2).

Now upon moving the clutch operator to a position that the portions 37b, 37c, 37d are axially intermediate the balls 45, 47, the recessed walls of the hub 18a force the balls 47 radially inwardly and as a result the rotation of sprocket 18 no longer imparts a driving motion to the annular clutch member 20. Now if the clutch operator 41 is further moved to shift the clutch operated member 37 in the direction of the arrow 65, the frusto-conical surface portion 37b forces the balls 47 radially outwardly to move into the recesses of hub of sprocket 34 when they are radially adjacent balls 47 thence onto surface 37c whereby the rotation of sprocket 34 causes balls 47 to impart driving rotary motion to clutch member 20. This results in shaft 21 being driven in a direction to propel the vehicle rearwardly.

It might be mentioned that through the utilization of the clutch mechanism of this invention, the axial spacing that would be required for conventional jaw-type clutches to provide both forward and rearward motion to the vehicle is substantially reduced. Additionally, with the apparatus invention, vehicles such as snowmobiles may be readily provided with a reverse drive without extensive modifications of the conventionally provided forward drive structure.

What is claimed is:

1. In a drive for a vehicle having a frame, a ground engagement propelling member and a drive shaft, transmission and clutch apparatus comprising a first sprocket keyed to the drive shaft to rotate therewith, a first chain in part mounted on the first sprocket for being driven thereby and first means driven by said first chain for selectively driving said ground engagement propelling member, said first means including a second sprocket, a third sprocket, second means for mounting said second and third sprockets to rotate in opposite directions and selectively drivingly connecting one of the second and third sprockets to the ground propelling member to propel the vehicle in the desired one of a forward and a reverse direction, said first chain being drivingly mounted on the second sprocket, and third means driven by the first chain and connected to the third sprocket for rotating the third sprocket in a direction opposite the direction the second sprocket is driven, the third means including a chain tightener fourth sprocket, fourth means mounted on the frame for mounting the fourth sprocket in abutting relationship with the first chain to be driven in a direction opposite the rotation of the first sprocket and means for drivingly connecting the fourth sprocket to the third sprocket to drive the third sprocket in the same direction as the fourth sprocket, and the second means including an axially elongated plunger having an enlarged diametric portion, and fourth means for mounting the plunger for limited axial movement between a first position and a second position and mounting the second sprocket to be drivingly rotated by the second sprocket only when the plunger is in its first position and the third sprocket to be drivingly rotated by the third sprocket only when plunger is in its second position, said fourth means being rotatably mounted on the frame and drivingly connected to the drive shaft.

2. The apparatus of claim further characterized in that the fourth means includes an annular member freely rotatably mounting the second and third sprockets, fifth means mounted for movement by annular member to move into a position to drivingly connect the second sprocket to the annular member by the plunger being moved to its first position and sixth means mounted for movement by the annular member to move into a position to drivingly connect the third sprocket to the annular member by the plunger being moved to its second position.

3. The apparatus of claim 2 further characterized in that the plunger has an offset of an effective size and shape that, upon the plunger being moved to its first and second position, the offset is moved into abutting relationship with the fifth and sixth means respectively and that the plunger is movable to a third position that the plunger offset is out of contact with both the fifth and sixth means, and that there is provided means on the frame to selectively move the plunger to any one of the three plunger positions.

4. The apparatus of claim 3 further characterized in that the annular member has a first pair of diametrically opposed radial apertures opening to the second sprocket and to the interior of the annular member, that the fifth means includes a metal ball mounted in each of the first pair of apertures for movement between a position extending into the interior of the annular member and a position extending exteriorly of the annular member, that the annular member has a second pair of diametrically opposed radial apertures opening to the second sprocket and to the interior of the annular member, that the sixth means includes a metal ball mounted in each of the second pair of apertures for movement between a position extending into the interior of the annular member and a position extending exteriorly of the annular member, the diameter of each ball being substantially greater than the radial dimension of the respective aperture, and that each of the second and third sprockets has diametrically opposed recesses opening to the annular member that are rotatably alignable with the first and second pair of apertures respectively to have the respective ball moved to form the driving connection from the second and third sprockets respectively to the annular member.

5. The apparatus of claim 4 further characterized in that the offset portion comprises an enlarged diametric portion having spaced oppositely faced frusto-conical portions that have major bases adjacent one another.

6. For driving a shaft in one of two opposite angular directions from the selected one of a first sprocket and a second sprocket that are driven in opposite angular directions comprising an annular first clutch member having an inner peripheral wall defining a central bore and a central axis and being adapted to mount said sprockets for rotation relative thereto in axially spaced relationship, an axially shiftable second clutch member mounted for movement by and relative the first clutch member to extend at least partially into said bore and first means operated by the movement of the second clutch member and mounted for movement by the first clutch member to drivingly connect the selected one of the sprockets to the first clutch member.

7. The apparatus of claim 6 further characterized in that the second clutch member has an enlarged diametric portion of a diameter forming a close sliding fit with the inner peripheral wall of the first clutch member located within said first clutch member bore for engaging said first means to move said first means into driving engagement with the selected one of the sprockets and a diametric portion of a diameter substantially less than the diameter of the enlarged diametric portion.

8. The apparatus of claim 7 further characterized in that the first clutch member has a pair of spaced apertures extending radially therethrough in which the first means is mounted, that the first means includes a member movably mounted in each of said apertures that has a greater dimension perpendicular to the central axis than the corresponding radial dimension of wall portion of the first clutch member wall that defines the respective aperture and that each sprocket has a recess opening to the first clutch member in a radially alignable position with the respective opening to have the movable member in the respective opening move partially thereinto.

9. The apparatus of claim 8 further characterized in that the enlarged diametric portion has a substantially constant diameter central portion, a first frusto-conical portion having a major base joined to said central portion and a second frusto-conical portion having a major base joined to the central portion axially opposite the first portion, that the axial spacing of said apertures is greater than the corresponding axial dimension of said constant diameter portion.

10. The apparatus of claim 9 further characterized in that each of said movable members comprises a rigid ball and that the second clutch member is movable to a first position permitting both balls moving freely out of the recesses, a second position that the enlarged diametric portion forces only one of said balls into the recess of the first sprocket and a third position that the enlarged diametric portion forces only the other of said balls into the recess of the second sprocket.

11. For driving a shaft in one of two opposite angular directions from the selected one of a first sprocket and a second sprocket that are driven in opposite angular directions wherein each of the sprockets has an axially extending, central bore therethrough and a recess opening radially to said bore, an axially elongated first clutch member having a central, axially elongated first bore therein, an exterior surface surrounding said first bore, a wall portion defining a first aperture opening to said first bore and through said exterior surface, and a second wall portion defining a second aperture opening to said first bore and through said exterior surface axially spaced from said first aperture, and being adapted to freely rotatably mount said sprockets axially adjacent one another with the first sprocket recess opening to the first aperture and the second sprocket recess opening to the second aperture, a movable second member movably mounted in the first aperture, a movable third member movably mounted in the second aperture, each of said movable members being of a size to extend both outwardly of said exterior surface into the adjacent recess and into the first bore, and first means mounted for axial movement in the first bore to force the selected one of said movable members outwardly to engage the respective sprocket recess to drivingly connect the respective sprocket to the first clutch member.

12. The apparatus of claim 11 further characterized in that the first means comprises an axially elongated shaft having an enlarged diametric portion of a diameter to form a close sliding fit with the first bore, said diametric portion having axially spaced frusto-conical portions having major bases adjacent one another.

13. The apparatus of claim 12 further characterized in that the axial spacing of said frusto-conical portions' major bases is sufficiently less than that of the axial spacing of the radially inward portions of the second and third members to permit both of the second and third members being sufficiently radially inwardly to be out of driving engagement with the respective sprocket.

14. For selectively driving a shaft from a driven sprocket having an axially extending central bore and a recess opening to said bore, an axially elongated first clutch member having a central, axially elongated first bore therein, an exterior surface surrounding said first bore, and a wall portion defining an aperture opening to said first bore and through said exterior surface and being adapted to be keyed to said shaft and to freely rotatably mount said sprocket with its recess angularly alignable with said aperture, a second member movably mounted in said aperture and having a dimension greater than the radial thickness of said wall portion and first means mounted for axial movement in the first bore between a position to force the second member outwardly of said exterior surface to a position for extending into the sprocket recess to drivingly connect the sprocket to the first member and alternately to a second position permitting the second members moving into the bore an effective distance that a driving connection between the sprocket and first member is broken.

15. The apparatus of claim 14 further characterized in that the first means comprises an axially elongated shaft having an enlarged diametric first portion of a diameter to form a close fit with the first bore, a second portion of a substantially smaller diameter than the first portion and a frusto-conical portion having a minor base joined to the second portion and a major base joined to the first portion.

16. The apparatus of claim 14 wherein the sprocket has a second recess diametrically opposite the first mentioned recess, further characterized in that the first clutch member has a wall portion defining a second aperture diametrically opposite the first mentioned aperture, and a third member movably mounted in the second aperture for being forced by the first means in one position into the second recess and alternately be permitted by movement of the first means to its second position to freely move out of the second recess, said second and third members comprising rigid balls each having a diameter greater than the radial thickness of the respective wall portion defining the apertures.

17. In a drive for a vehicle having a frame, a ground engagement propelling member and a drive shaft, transmission and clutch apparatus comprising a first sprocket keyed to the drive shaft to rotate therewith, a first chain in part mounted on the first sprocket for being driven thereby and first means driven by said first chain for selectively driving said ground engagement propelling member, said first means including a second sprocket, a third sprocket, second means for mounting said second and third sprockets to rotate in opposite directions and selectively drivingly connecting one of the second and third sprockets to the ground propelling member to propel the vehicle in the desired one of a forward and a reverse direction, said first chain being drivingly mounted on the second sprocket, and third means driven by the first chain and connected to the third sprocket for rotating the third sprocket in a direction opposite the direction the second sprocket is driven, the third means including a chain tightener fourth sprocket, fourth means mounted on the frame for mounting the fourth sprocket in abutting relationship with the first chain to be driven in a direction opposite the rotation of the first sprocket and means for drivingly connecting the fourth sprocket to the third sprocket to drive the third sprocket in the same direction as the fourth sprocket, each of the second and third sprockets having an inner wall portion defining an axially extending bore, each wall portion having a recess opening to said bore, and the second means including an annular clutch member extending through said bores to rotatably mount the second and third sprockets and keyed to said drive shaft, said annular clutch member having a first and a second radial aperture therethrough for the second and third sprockets respectively, each aperture being located in a plane perpendicular to the axis of rotation of the second and third sprockets that passes through the recess of the respective second and third sprocket, a radially movable member mounted in each aperture for radial movement into the adjacent recess to drivingly connect the respective sprocket to the clutch member and alternately out of the respective recess out of a driven relationship to the respective sprocket, and means slidably mounted by the annular clutch member for movement between a first position forcing one radially movable member into the adjacent recess and permitting the other radially movable member freely moving out of its adjacent recess and a second position forcing the said other radially movable member into the adjacent recess and permitting the one radially movable member freely moving out of the adjacent recess.

18. The apparatus of claim 17 further characterized in that the last mentioned means includes an axially elongated plunger slidably extended into the annular clutch member and having an enlarged diametric portion for forcing the axially adjacent radially movable member radially outwardly.

References Cited

UNITED STATES PATENTS

| 796,748 | 8/1905 | Marshall | 192—93 C |
| 2,431,580 | 11/1947 | Orr | 74—220 X |
| 2,562,576 | 7/1951 | Raney et al. | 74—220 |
| 2,675,709 | 4/1954 | Dowdy | 74—242.16 |
| 3,334,522 | 8/1967 | Toffin | 74—220 |
| 3,477,439 | 11/1969 | Hamouz et al. | 74—220 X |

LEONARD H. GERIN, Primary Examiner

U.S. Cl. X.R.

74—242.16; 192—93 C